(12) United States Patent
Kassman et al.

(10) Patent No.: US 7,021,657 B2
(45) Date of Patent: Apr. 4, 2006

(54) AIR BAG INCLUDING VARIABLE TETHERS

(75) Inventors: Mark E. Kassman, Miamisburg, OH (US); Mark Thomas Winters, Troy, OH (US); Ann L. Kneisly, Dayton, OH (US); Patrick W. Schatz, Tipp City, OH (US); Ryan Todd Pinsenschaum, Vandalia, OH (US)

(73) Assignee: Delphi Technologies, Inc., Troy, MI (US)

( * ) Notice: Subject to any disclaimer, the term of this patent is extended or adjusted under 35 U.S.C. 154(b) by 259 days.

(21) Appl. No.: 10/291,127

(22) Filed: Nov. 8, 2002

(65) Prior Publication Data

US 2004/0090055 A1 May 13, 2004

(51) Int. Cl.
*B60R 21/16* (2006.01)

(52) U.S. Cl. .................................................. 280/743.2
(58) Field of Classification Search ................ 280/731, 280/732, 739, 743.2
See application file for complete search history.

(56) References Cited

U.S. PATENT DOCUMENTS

| | | | | |
|---|---|---|---|---|
| 5,044,663 A | * | 9/1991 | Seizert ..................... 280/730.1 |
| 5,172,934 A | * | 12/1992 | Frantz et al. ............... 280/740 |
| 5,308,113 A | | 5/1994 | Moriset ...................... 280/743 |
| 5,380,038 A | * | 1/1995 | Hawthorn et al. ....... 280/730.1 |
| 5,489,119 A | | 2/1996 | Prescaro et al. ......... 280/743.2 |
| 5,762,367 A | | 6/1998 | Wolanin ..................... 280/736 |
| 5,887,894 A | * | 3/1999 | Castagner et al. ....... 280/743.2 |
| 5,997,037 A | * | 12/1999 | Hill et al. ................. 280/743.2 |
| 6,076,854 A | | 6/2000 | Schenck ................... 280/743.2 |
| 6,086,096 A | * | 7/2000 | Link et al. ............... 280/743.2 |
| 6,209,911 B1 | * | 4/2001 | Igawa et al. ............... 280/740 |
| 6,390,501 B1 | | 5/2002 | Greib et al. ............. 280/743.2 |
| 6,419,267 B1 | * | 7/2002 | Hashimoto et al. ...... 280/743.1 |
| 6,422,597 B1 | | 7/2002 | Pinsenschaum et al. ... 280/735 |
| 6,425,603 B1 | | 7/2002 | Eschbach ................. 280/743.2 |
| 6,454,300 B1 | | 9/2002 | Dunkle et al. ............. 280/742 |
| 6,502,858 B1 | * | 1/2003 | Amamori ................. 280/743.2 |
| 6,561,545 B1 | | 5/2003 | Greib et al. |
| 6,592,146 B1 | | 7/2003 | Pinsenschaum et al. |
| 6,616,184 B1 | * | 9/2003 | Fischer .................... 280/743.2 |
| 6,749,217 B1 | * | 6/2004 | Damian et al. ............ 280/734 |
| 2002/0036400 A1 | | 3/2002 | Winters et al. .......... 280/743.2 |
| 2002/0146949 A1 | * | 10/2002 | Keshavaraj ................. 442/76 |

* cited by examiner

*Primary Examiner*—Paul N. Dickson
*Assistant Examiner*—Laura B. Rosenberg
(74) *Attorney, Agent, or Firm*—Scott A. McBain (57) ABSTRACT

An air bag assembly adapted for use in opposing relation to a vehicle occupant. The assembly includes one or more tethering elements which may be selectively released from a first restrained condition to a second restrained condition in a predefined manner so as to control the inflated profile of the air bag cushion based upon vehicle and/or occupant conditions while nonetheless maintaining tension within the tethering elements in both the first and second restrained conditions.

10 Claims, 11 Drawing Sheets

AIR BAG INCLUDING VARIABLE TETHERS

TECHNICAL FIELD

This invention relates to an air bag assembly, and more particularly to an air bag assembly including an inflatable air bag cushion having an arrangement of tethering elements within the air bag cushion to provide variable controlled shaping restraint within the air bag cushion. The tethers are releasable from a first restrained condition imparting a restrained tension to the air bag cushion to at least a second restrained condition so as to permit the air bag cushion to inflate to an enhanced profile while still providing a restrained tensioning arrangement.

BACKGROUND OF THE INVENTION

It is well known to provide an air bag assembly including an inflatable air bag cushion for protecting the occupant of a transportation vehicle. In an automotive vehicle such air bag assemblies are typically located in the hub of the steering wheel and in a recess in the vehicle instrument panel for protection of the vehicle occupants seated in opposing relation to such assemblies. Additional air bag assemblies may be located within the seats and/or door panels for protection of occupants during a side impact event. Air bag assemblies typically include an inflatable cushion, and a gas emitting inflator mounted in fluid communication with the inflatable cushion. In a driver side air bag module, a base plate typically supports the inflator at the interior of the steering wheel or other appropriate location opposing the occupant to be protected. The mouth of the air bag is disposed in surrounding relation to the inflator with a perimeter portion of the mouth being held between the base plate and an overlying retainer to effect a secure relation between the inflator and the cushion. In a passenger side assembly, the inflator is typically held within a trough-like housing with the air bag cushion being held along the walls of the housing such that inflation gas passes from the inflator into the cushion upon activation of the inflator. Both driver side air bag modules and passenger side air bag modules are well known. In the past it has been advocated to adjust the inflated profile of air bag cushions by selective release of tethering elements.

SUMMARY OF THE INVENTION

The present invention provides advantages and alternatives over the prior art by providing an air bag assembly adapted for use in opposing relation to a vehicle occupant which assembly includes one or more tethering elements which may be cooperatively released from a first restrained condition to a second restrained condition in a predefined manner so as to control the inflated profile of the air bag cushion based upon vehicle and/or occupant conditions while nonetheless maintaining tension in within the tethering elements in both the first and second restrained conditions.

BRIEF DESCRIPTION OF THE DRAWINGS

The present invention will now be described by way of example only, with reference to the accompanying drawings which constitute a part of the specification herein and in which.

While the invention has been illustrated and generally described above, it will hereinafter be described in connection with certain exemplary embodiments, constructions and procedures, it is to be understood that in no event is the invention to be limited to such illustrated and described embodiments, constructions and procedures. On the contrary, it is intended that the present invention shall extend to all alternatives and modifications as may embrace the principles of this invention within the true spirit and scope thereof.

DESCRIPTION OF THE PREFERRED EMBODIMENT

Figure 1:
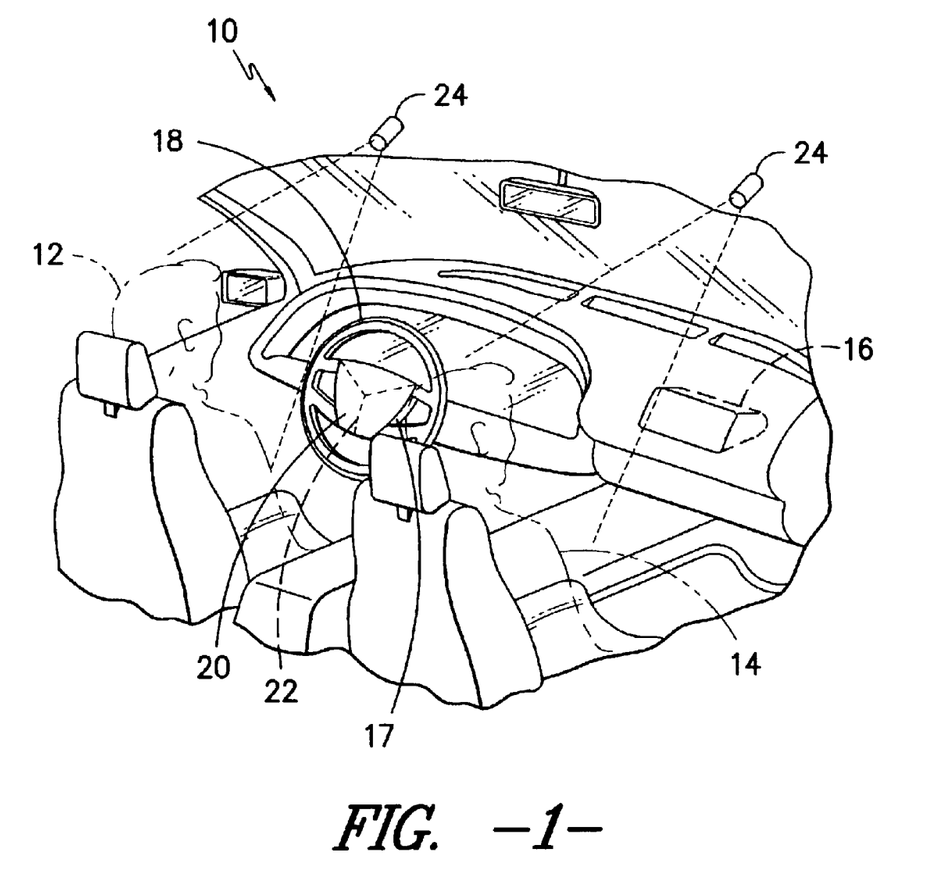
FIG. 1 is a view of the interior of an automotive vehicle incorporating driver side and passenger side air bag modules.

Reference will now be made to the drawings wherein to the extent possible like reference numerals are utilized to designate like components throughout the various views. In FIG. 1, there is illustrated the interior of a vehicle 10 for transporting an operator 12 and a passenger 14. As illustrated, the vehicle 10 may include a passenger side air bag system 16 mounted within the dash panel in substantially opposing relation to the vehicle passenger 14. The vehicle 10 will also include a driver side air bag system 17 mounted within the steering wheel 18 for protection of the vehicle operator 12. According to a potentially preferred practice, the air bag assembly mounted within the steering wheel 18 is stored in hidden relation below a cover 20 which opens along tear seams 22 upon activation of the air bag assembly in a manner as will be well known to those of skill in the art. Such activation typically takes place upon the occurrence and measurement of predetermined vehicle conditions such as deceleration at a rate exceeding a predetermined value.

Figure 2:
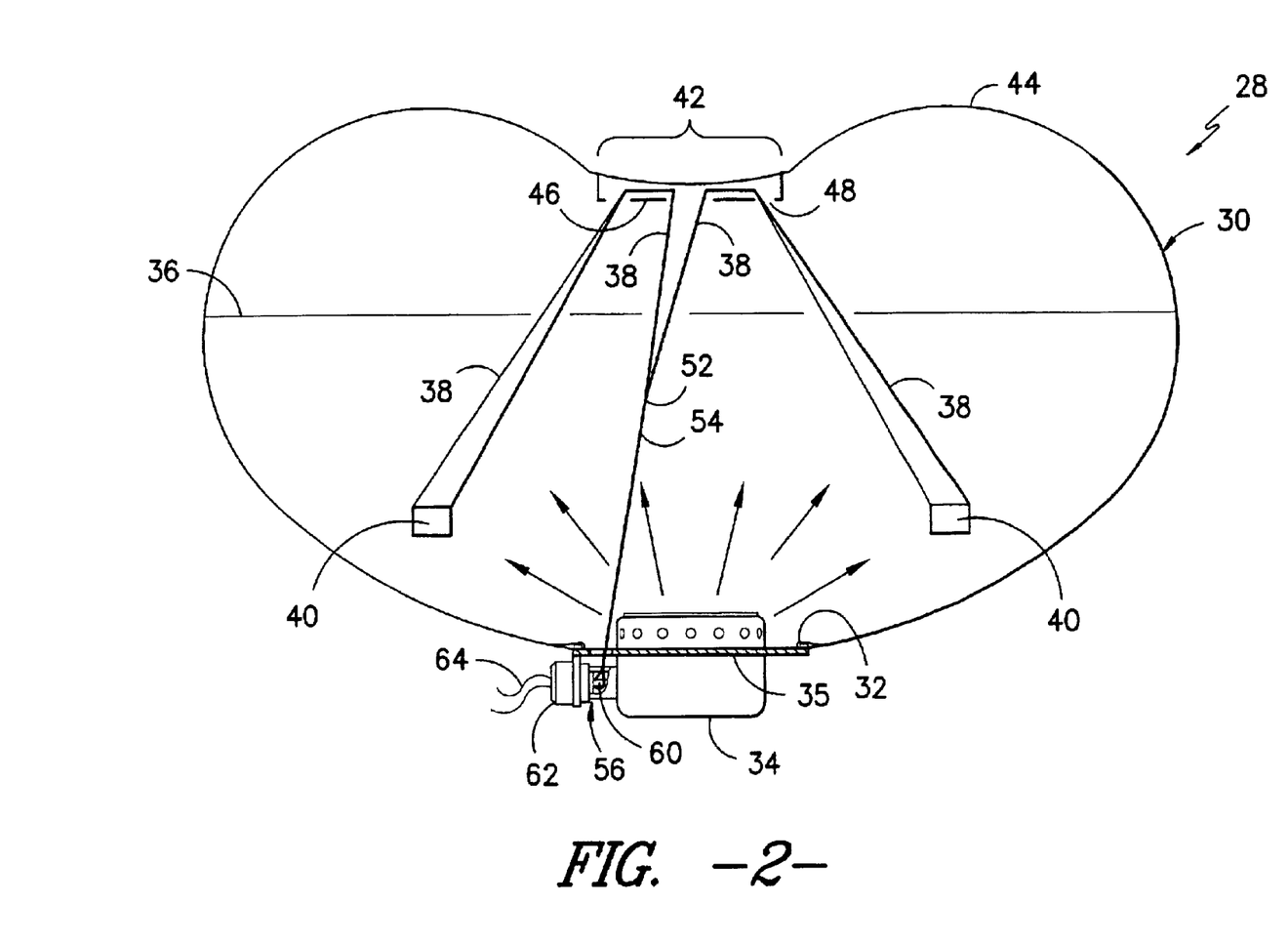
FIG. 2 is a cut-away schematic of an air bag cushion incorporating shape-controlling tethering elements held in a first restrained condition restraining the air bag cushion to a first depth.
Figure 3:
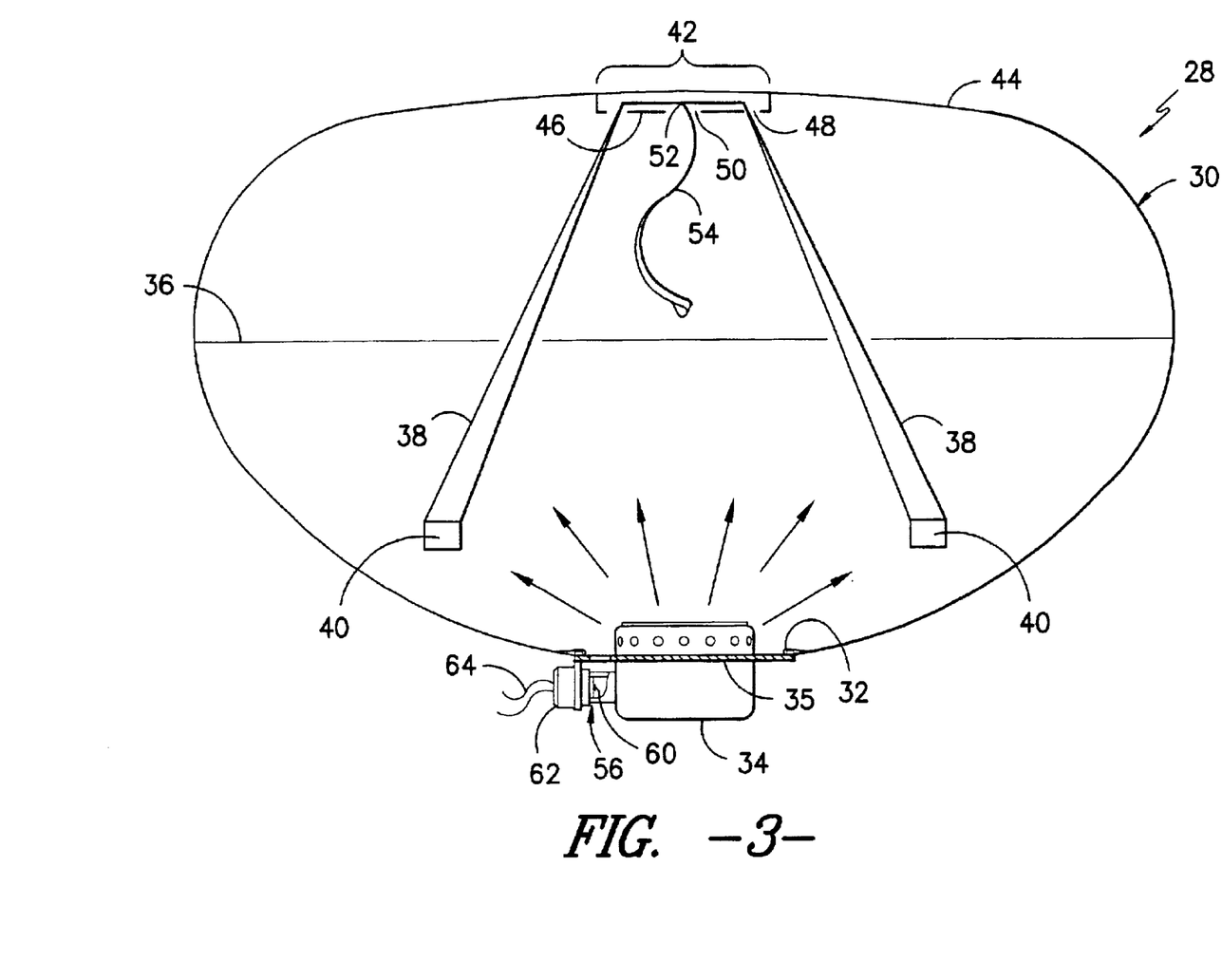
FIG. 3 is a view similar to FIG. 2 illustrating the tethering elements in an extended operative depth condition restraining the air bag cushion to a second depth.
Figure 4:
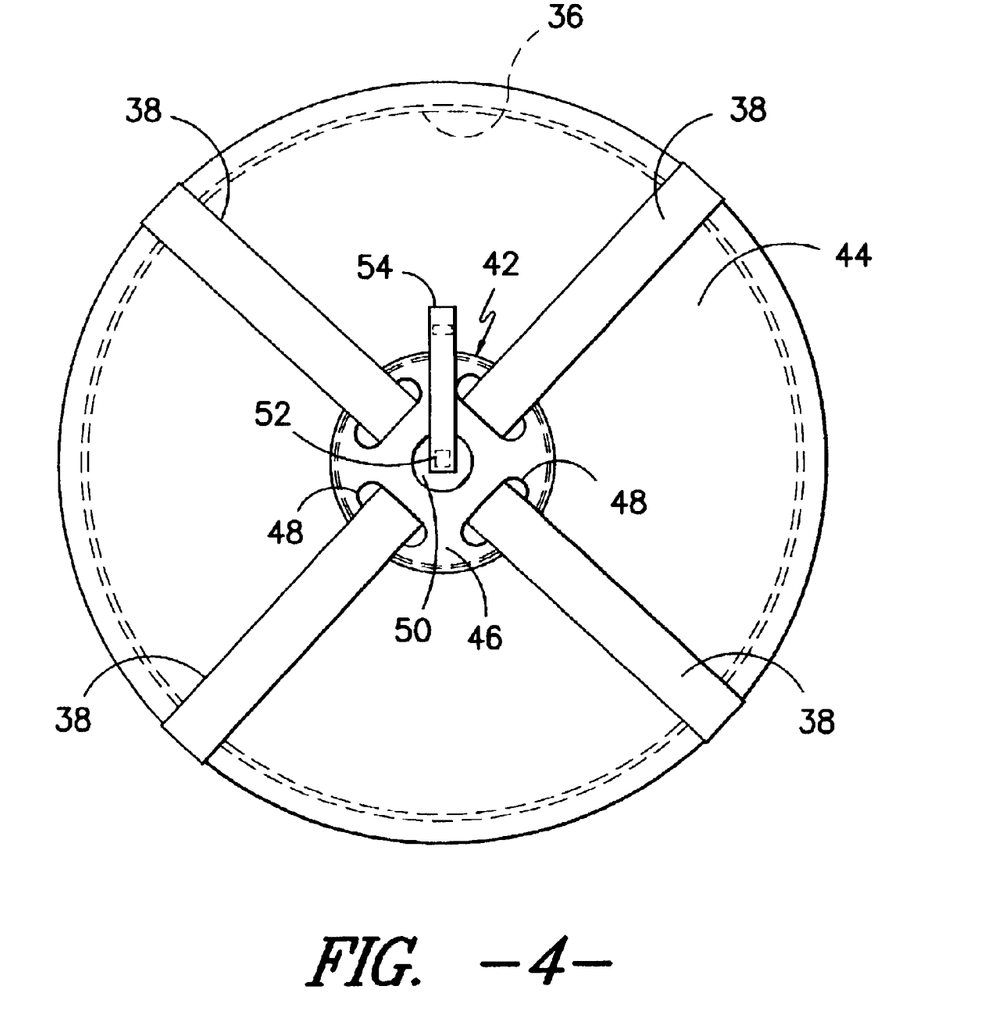
FIG. 4 is a view illustrating an arrangement of tethering elements at the interior of the impact face of the air bag cushion.
Figure 5:
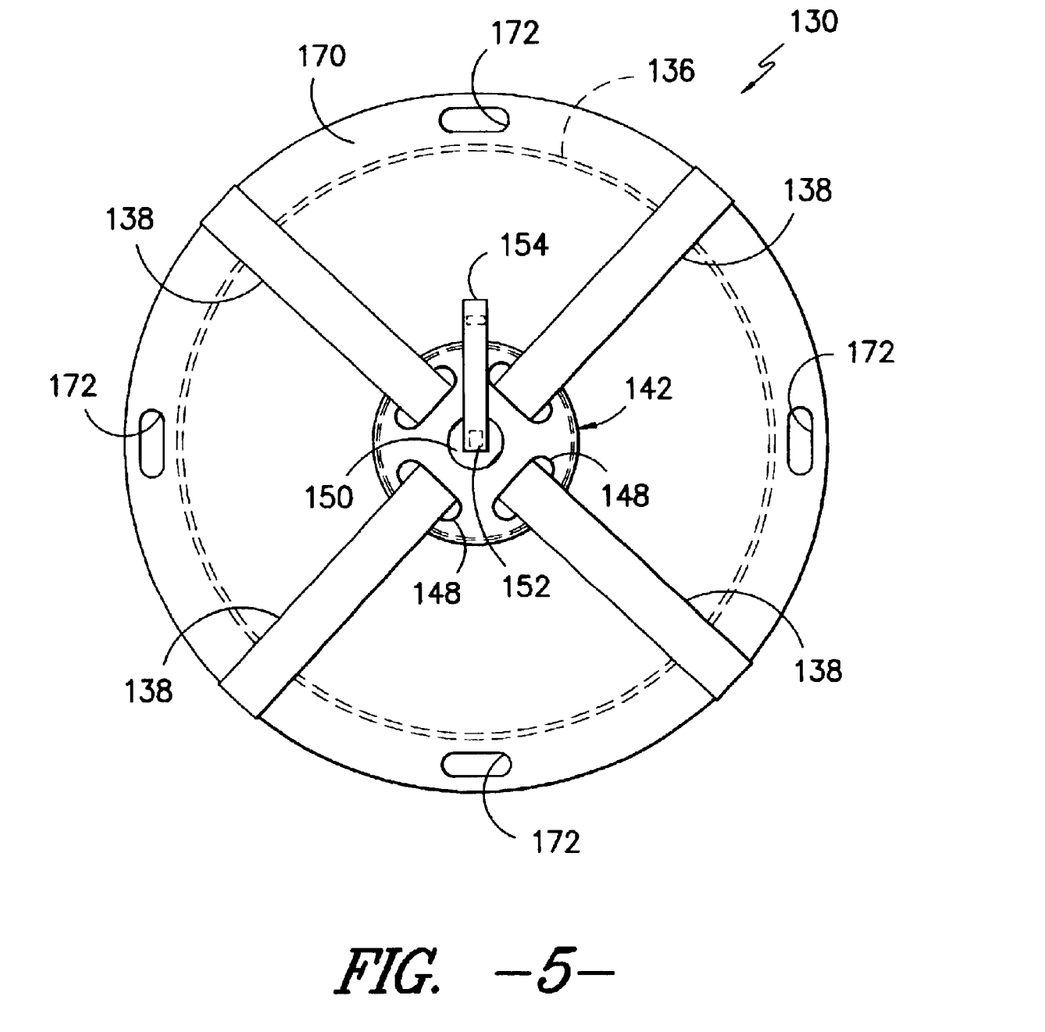
FIG. 5 is a view similar to FIG. 4 illustrating an air bag cushion construction including tether accepting openings disposed around the perimeter of the air bag cushion.

As shown, the vehicle 10 may incorporate one or more sensors 24 such as optical sensors for measuring the dimensions of the vehicle occupants 12, 14. Likewise, mass and/or position sensors (not shown) may be incorporated within the seaming structure and/or at other suitable locations to provide further information on the characteristics of the vehicle occupants. A sensor may also be provided to register whether or not the occupants are utilizing recommended seat belts. Data from the various sensors measuring occupant parameters as well as data from sensors measuring vehicle conditions may be translated to an onboard computer which in turn relays deployment activation signals to the driver side air bag system 17 and the passenger side air bag system 16 during a collision event. Referring to FIGS. 2–4, a first arrangement for a vehicle air bag assembly is shown schematically. As shown, the air bag assembly 28 includes an inflatable air bag cushion 30 having a gas inlet opening 32 in fluid communication with a gas emitting inflator 34 which may be housed at a support member 35 such as a base plate or the like.

As will be appreciated by those of skill in the art, the air bag cushion 30 may be formed by seaming together panels of pliable material such as fabric and the like to achieve a desired configuration. In the illustrated assembly, the air bag cushion 30 may be formed by seaming together two substantially disk shaped pieces of material by a seam 36 to form the construction substantially as illustrated in FIG. 2. Of course, it is to be understood that this simplified construction is exemplary only and that any other construction including multiple panel constructions may likewise be utilized if desired.

In the illustrated embodiment, the air bag assembly 28 includes an arrangement of shape restraining elongate tethering elements 38 such as elongate straps or the like. As illustrated, the tethering elements 38 preferably extend from positions of attachment 40 on a body portion of the air bag cushion 30 to a collection region 42 at the interior of an impact face 44 of the air bag cushion 30.

As best illustrated in FIG. 4 wherein the air bag cushion 30 is shown turned inside out from its normal operative condition, the collection region 42 may include a threaded guide element 46 in the form of a panel of material seamed around its perimeter to the underside of the impact face 44. According to the illustrated construction, the guide element 46 includes a plurality of perimeter acceptance openings 48 for acceptance of the tethering elements. The guide element 46 also preferably includes a central outlet opening 50 through which the joined together tethering elements 38 may be pulled in a manner to be described further hereinafter.

As best illustrated through simultaneous reference to FIGS. 2 and 4, the tethering elements 38 may be joined together at the position of convergence below the guide element 46 such as by a seam 52 which connects the tethering elements 38 together and in affixed relation to an anchoring line 54 such as a strap or the like. Thus, by pulling the anchoring line 54 away from the impact face 44, the effective operative depth of the tethering elements 38 may be shortened (FIG. 2). As illustrated, the shortened operative depth of the tethering elements 38 may be maintained by holding the anchoring line 54 at an anchoring assembly 56 which is adapted to selectively disengage from the anchoring line 54 under conditions where expanded depth is desired in the air bag cushion 30.

By way of example only, and not limitation, according to one contemplated arrangement the anchoring assembly 56 may include a displaceable locking pin element 60 which mateably engages a portion of the anchoring line 54 so as to hold the anchoring line 54 in place with the tethering elements 38 in the shortened operative condition illustrated in FIG. 2. The locking pin element 60 may be operatively connected to a solenoid 62 which strokes open or closed upon the receipt of an activation signal through lead lines 64 such that upon activation, the locking pin element 60 is moved out of locking relation to the anchoring line 54 (FIG. 3). By way of example only, such activation may take place in instances such as use of the system by a large occupant and/or an occupant seated a substantial distance away from the air bag cushion and/or an impact event of extreme severity in which enhanced cushion depth may be desirable.

Of course, the disengagement of a locking pin element is to be understood as being merely an exemplary method of releasing the anchoring line 54 and that any other suitable method may likewise be used. By way of example only, and not limitation, it is contemplated that the solenoid 62 may be replaced with a pressure generating squib which moves the locking pin element 60 out of engagement with the anchoring line 54. It is also contemplated that the anchoring line 54 may be held in place by a frangible explosive-type bolt release which is activated by an initiator. It is also contemplated that the anchoring line 54 may be cut or burned through such as by the use of an actuated knife blade or detonation cord or the like.

Regardless of the actual structure of the anchoring assembly, it is contemplated that the anchoring assembly 56 will be adapted to selectively retain or release the anchoring line 54 so as to adjust the operative depth of the tethering elements 38. In operation, it is contemplated that the anchoring line 54 will be normally held at the anchoring assembly 56 so as to shorten the operative depth of the tethering elements 38 and thereby restrain the depth of the air bag cushion 30 (FIG. 2). However, upon the occurrence of vehicle and/or occupant conditions which necessitate a deeper air bag profile, the solenoid 62 or other release mechanism is activated thereby releasing the anchoring line 54 and allowing the air bag cushion 30 to expand to a deeper profile (FIG. 3). As will be appreciated, in the extended depth arrangement illustrated in FIG. 3, the tethering elements 38 preferably remain in affixed relation to one another even after the release of the anchoring line 54. Thus, even in the expanded depth arrangement, the tethering elements 38 are held in tension and cannot be withdrawn completely from the guide element 46. A degree of profile restraint is thereby maintained by the tethering elements 38 even in the released condition.

Figure 6:
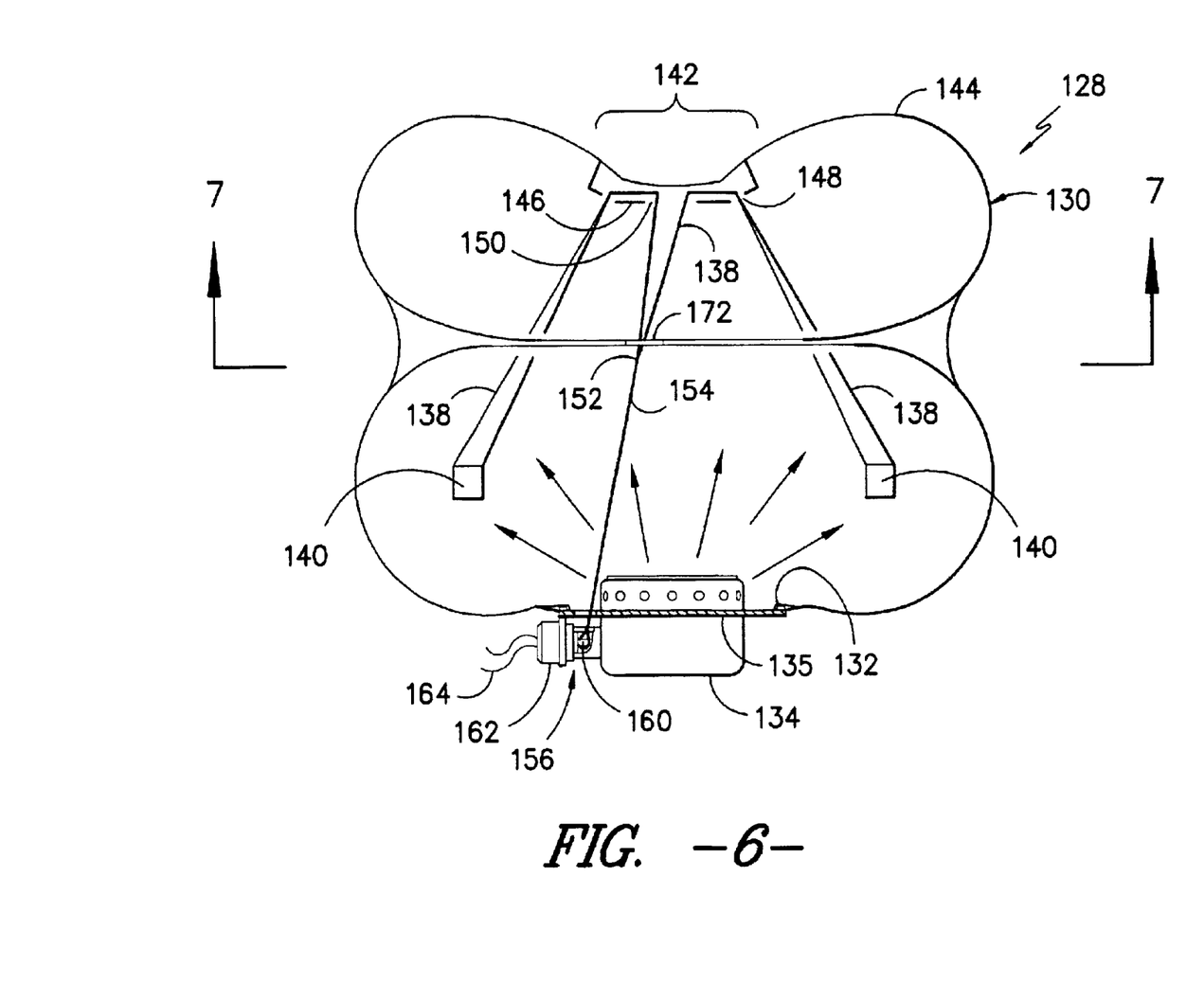
FIG. 6 illustrates the air bag cushion arrangement in FIG. 5 in operation with the tethers at the interior and passing through the tether accepting openings collected at the center of the air bag cushion.
Figure 7:
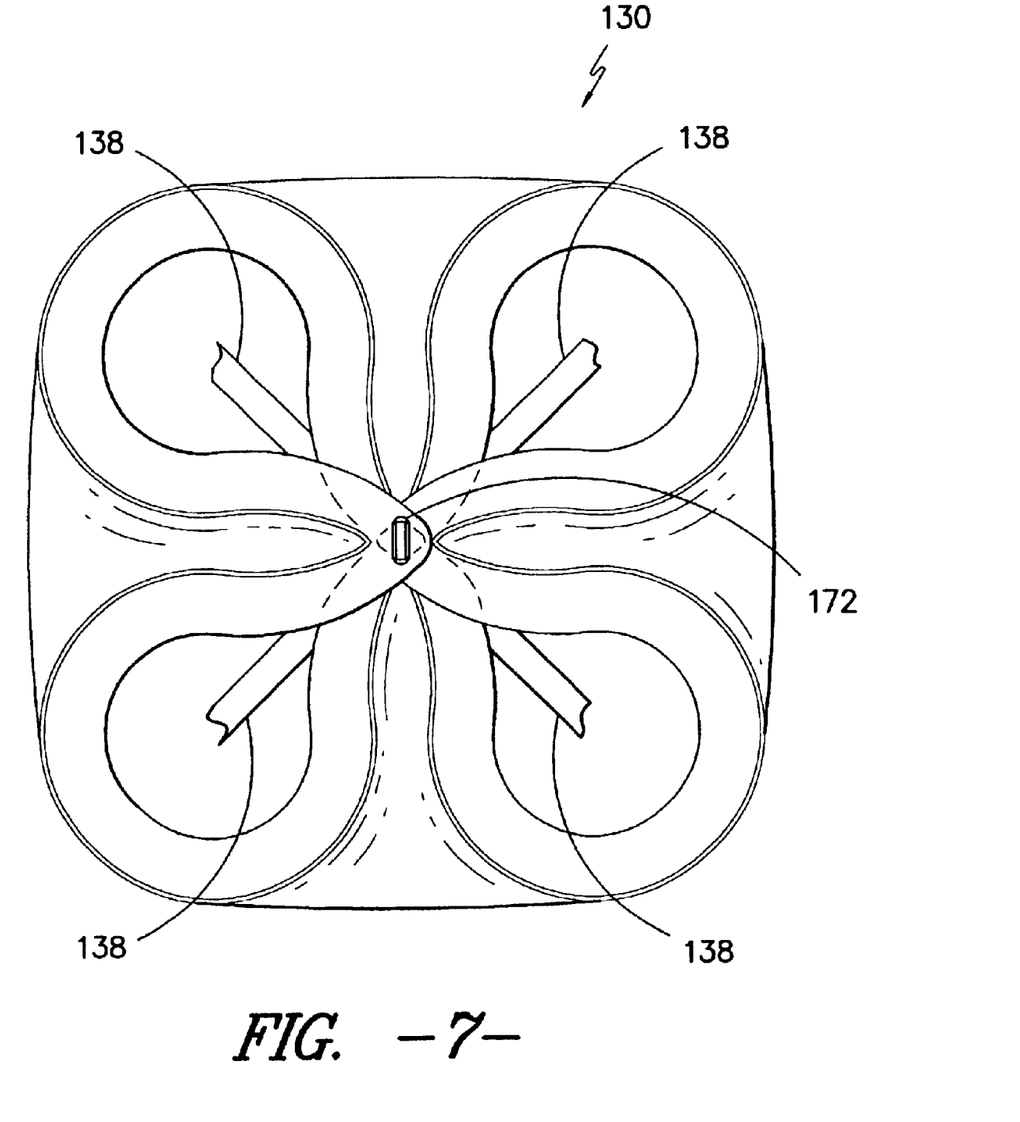
FIG. 7 is a view taken generally along line 7—7 in FIG. 6 illustrating the gathered edge arrangement of the air bag cushion.
Figure 8:
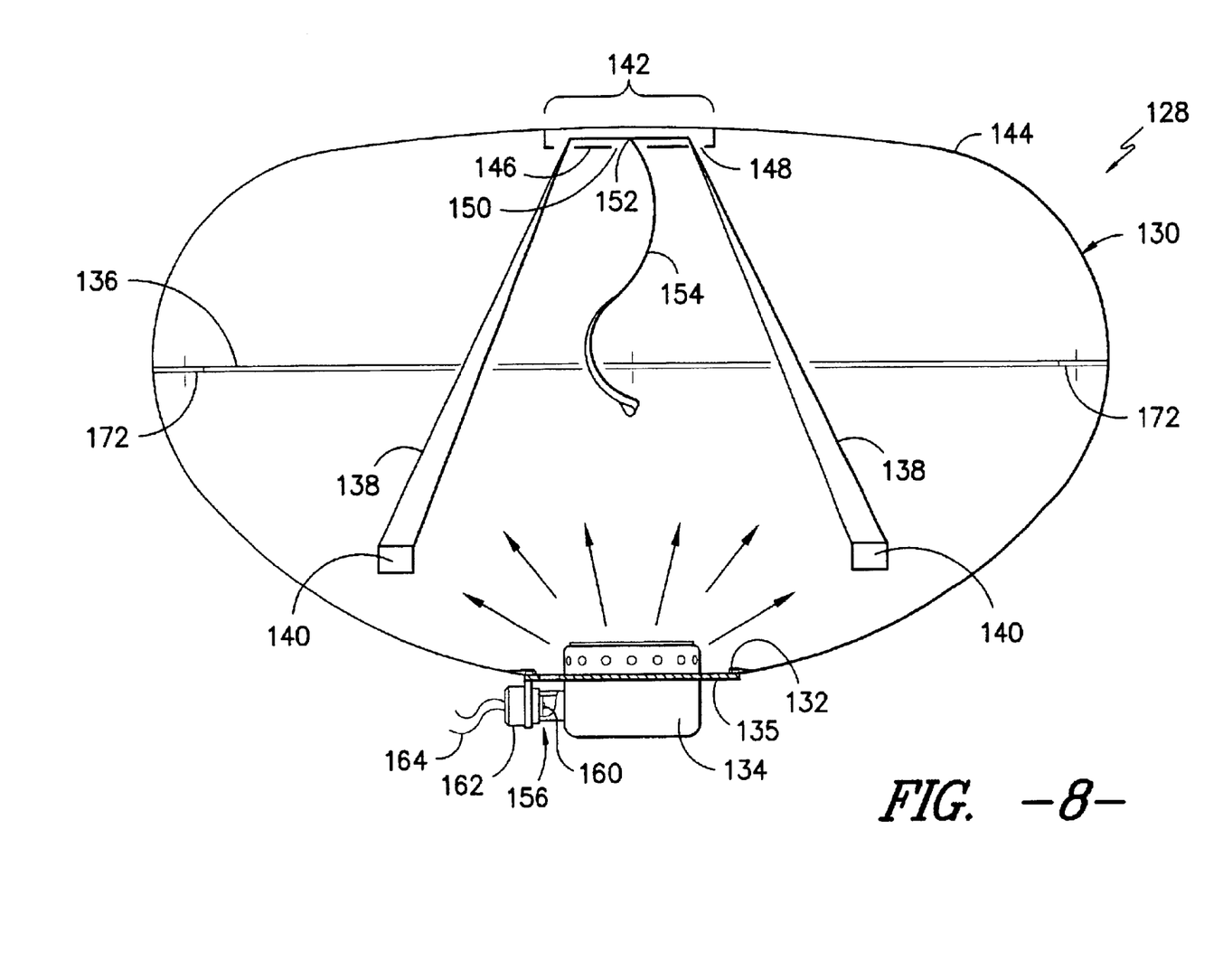
FIG. 8 is a view similar to FIG. 6 following release of the tethering elements to an extended operative depth.

As will be appreciated, the present invention is adaptable to a large number of alternatives and variations. By way of example only, and not limitation, a variation on the embodiment as described above is illustrated in FIGS. 5–8 wherein elements corresponding to those previously illustrated and described are designated by like reference numerals increased by 100. As shown, the air bag cushion 130 is substantially similar to the configuration previously described with the exception that the perimeter includes a peripheral selvage portion 170 located outboard of the perimeter seam 136. As shown, a multiplicity of openings 172 is disposed around the selvage portion 170. As will be appreciated by those of skill in the art, the air bag cushion is typically formed with the attached tethers sewn around the exterior and is thereafter turned inside out for subsequent use. Thus, in the operative condition the selvage 170 defines an interior ring with the openings 172 inboard of the perimeter seam 136 (FIG. 8). As best seen in FIG. 7, in order to provide radial profiling restraint, each of the openings 172 may thereafter be pulled to the center of the air bag cushion 130 in a gathered relationship. This gathering at the center transforms the previously circular air bag cushion 130 to a substantially square orientation. As best illustrated in FIG. 6, the gathered arrangement yielding the relatively low profile square orientation may be maintained by passing the anchoring line 154 through the aligned openings 172 and securing the anchoring line 154 in place at the anchoring assembly 156 as previously described. Thus, prior to the activation of the anchoring assembly 156 to release the anchoring line 154, the tethering elements 138 are held in a state of shortened operative depth with the sides of the air bag cushion 130 being simultaneously restrained against radial expansion. Upon the release of the anchoring line 154, the outward projection of the impact face 144 pulls the anchoring line 154 out of engagement with the openings 172 thereby allowing the air bag cushion 130 to expand radially outwardly to provide enhanced lateral coverage. At the same time, the tethering elements 138 are permitted to extend to their full normal operative depth between the positions of attachment 140 on the air bag cushion body and the guide element 146 at the collection region 142. However, as with the previously described construction, the tethering elements 138 remain attached to one another and thus maintain a degree of shape forming tethering tension even in the released stated illustrated in FIG. 8.

Figure 9:
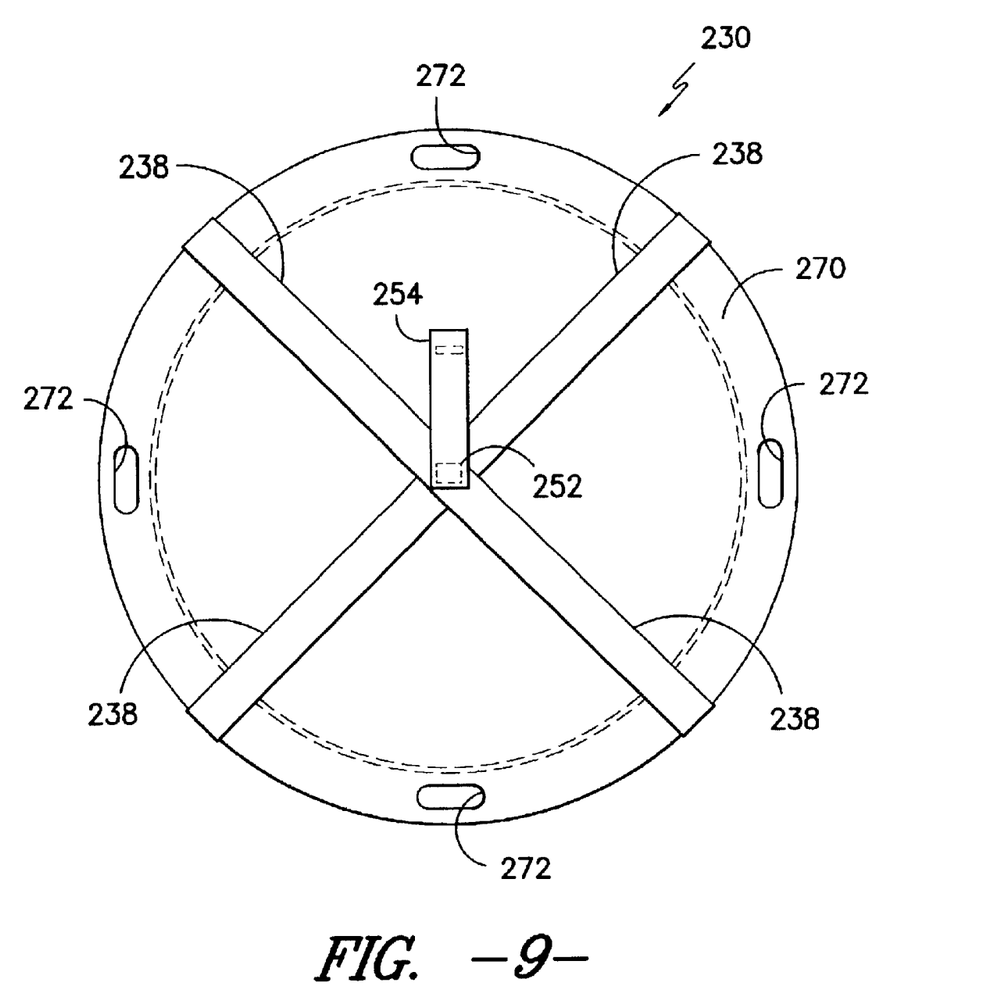
FIG. 9 is a view similar to FIG. 5 illustrating an alternative tethering arrangement at the interior of the face of the air bag cushion.
Figure 10:
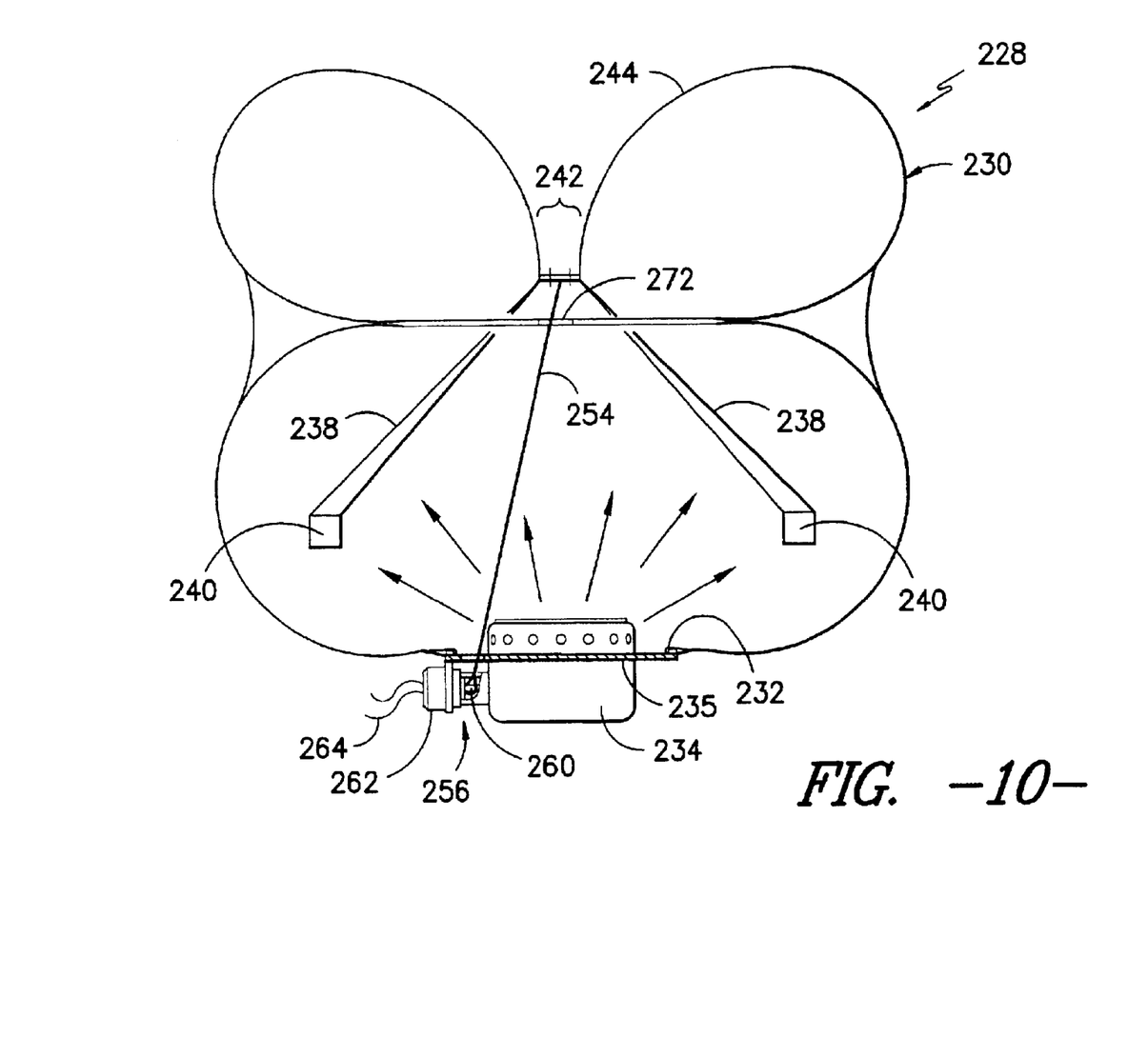
FIG. 10 is a view illustrating the air bag cushion of FIG. 9 in a constrained gathered condition with the tethering elements held to a first restrained operative depth.
Figure 11:
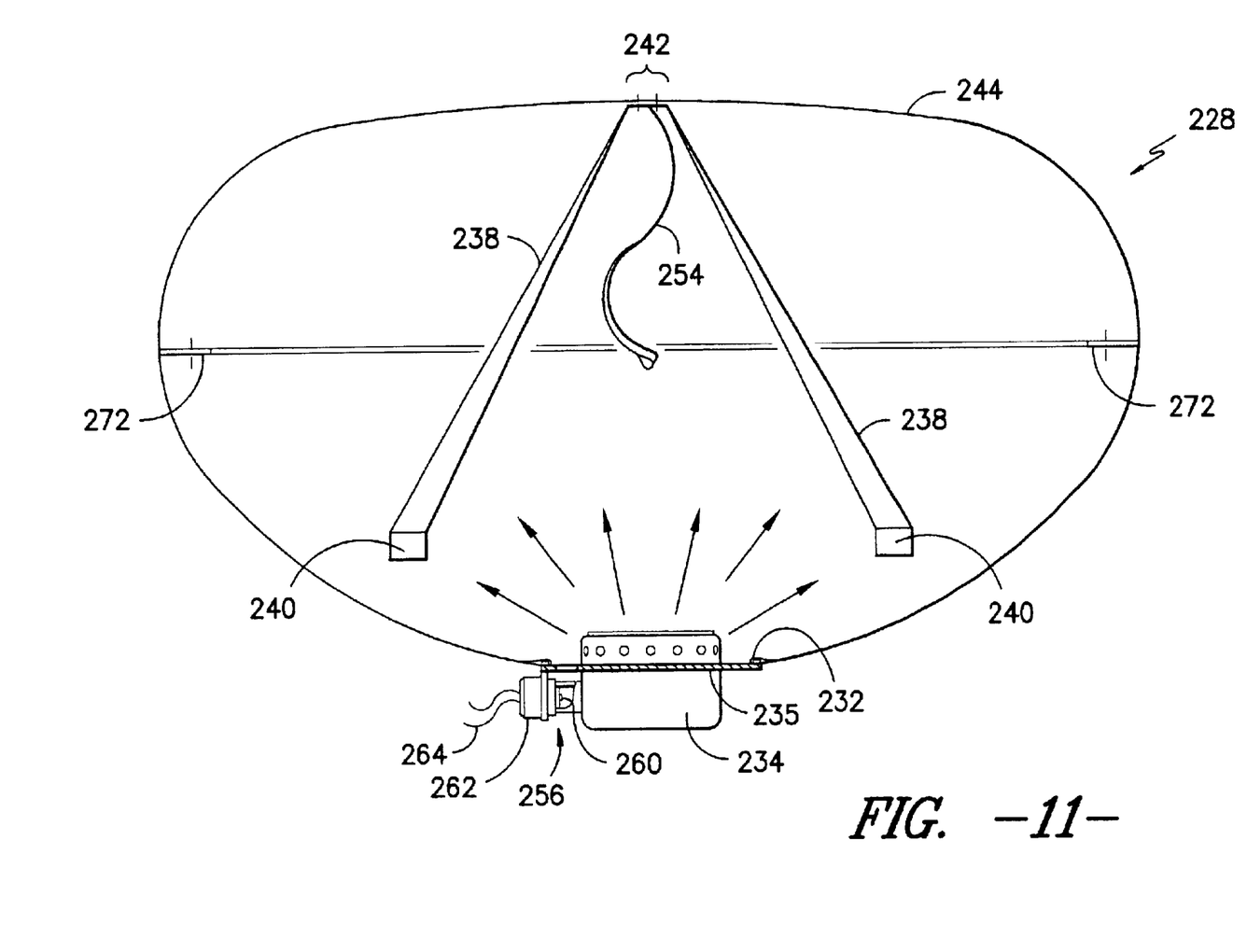
FIG. 11 is a view similar to FIG. 10 but with the tethering elements in a released condition and with air bag cushion expanded to an increased depth.

Still another exemplary embodiment of the present invention is illustrated in FIGS. 9–11 wherein elements corresponding to those previously described are designated by like reference numerals within a 200 series. In the illustrated embodiment, the tethering elements 238 extend away from positions of attachment 240 along the air bag cushion body to a collection region 242 at the impact face 244. At the collection region 242, the tethering elements 238 are affixed by a seam 252 to both the impact face 244 as well as to an anchoring line 254. Thus, as illustrated in FIG. 10, the impact face 244 is restrained directly by the anchoring line 254. As shown, such an arrangement provides an enhanced degree of restraint at the impact face 244. In the illustrated arrangement, the air bag cushion 230 also includes a selvage portion 270 with acceptance openings 272 as previously described in relation to the embodiment of FIGS. 5–8. Thus, as shown in FIG. 10, substantial restraint may be achieved in both the lateral and vertical expansion of the air bag cushion 230 when the anchoring line 254 is held in an anchored position. However, upon release of the anchoring line 254, both vertical and lateral expansion is permitted (FIG. 11). Of course, as with previous embodiments, the tethering elements 238 retain an effective operative depth between the positions of attachment 240 and the collection region 242 such that a degree of shape defining tensioning restraint is maintained even in the released condition. Of course, if desired, the perimeter openings 272 may be eliminated or not used so as to provide greater radial expansion even in the initial restrained condition.

It is to be understood that while the present invention has been illustrated and described in relation to various exemplary embodiments, constructions and practices that such embodiments, constructions and practices are intended to be illustrative only and that the present invention is in no event to be limited thereto. Rather, it is contemplated that modifications and variations embodying the principles of the present invention will no doubt occur to those of skill in the art and it is therefore contemplated and intended that the present invention shall extend to all such modifications and variations as may incorporate the broad principles of the invention within the full spirit and scope thereof.

What is claimed is:

1. An air bag assembly for cushioning restraint of a vehicle occupant during an impact event, the air bag assembly comprising:

an inflatable air bag cushion adapted to be inflated to assume an inflated profile when connected to a gas emitting inflator such that upon discharge of inflation gas from the inflator the air bag cushion is inflated to a deployed state from a location of deployment in substantially opposing relation to the occupant, the air bag cushion including an impact face portion and side portions extending away from the impact face portion;

a plurality of elongate profile restraining tether elements disposed within the air bag cushion, wherein at least a portion of the profile restraining tether elements intersect with one another so as to define a tether intersection, wherein the tether elements are operatively coupled to one another at the tether intersection and wherein the tether elements extend radially away from the tether intersection to points of secure attachment remote from the impact face portion; and an elongate anchoring line having a first end secured to the profile restraining tether elements substantially at the tether intersection and a second end normally anchored in releasable relation to a support structure remote from the impact face portion, the elongate anchoring line having an operative length such that when the anchoring line is anchored to the support structure the tether intersection is pulled towards the support structure and the inflated profile of the air bag cushion is restrained to a first depth, and wherein the anchoring line is releasable from anchoring relation to the support structure in response to an activation signal such that upon release the tether elements restrain the air bag cushion to a second depth which is greater than said first depth, wherein a substantially two dimensional tether guide element is secured to an interior surface of the impact face portion, the tether guide element comprising a plurality of peripheral openings adapted for sliding passage of the profile restraining tether elements and an interior opening inboard of the peripheral openings adapted for sliding passage of the tether intersection and surrounding portions of the tether elements therethrough when the anchoring line is anchored to the support structure.

2. The invention as recited in claim 1, wherein the tether guide element comprises a panel of pliable material.

3. The invention as recited in claim 2, wherein the panel of pliable material comprises a textile fabric.

4. An air bag assembly for cushioning restraint of a vehicle occupant during an impact event, the air bag assembly comprising:

an inflatable air bag cushion adapted to be inflated to assume an inflated profile when connected to a gas emitting inflator such that upon discharge of inflation gas from the inflator the air bag cushion is inflated to a deployed state from a location of deployment in substantially opposing relation to the occupant, the air bag cushion including an impact face portion and side portions extending away from the impact face portion and wherein the side portions include a plurality of guide slots disposed at an interior surface of the side portions;

a plurality of elongate profile restraining tether elements disposed within the air bag cushion, wherein at least a portion of the profile restraining tether elements intersect with one another so as to define a tether intersection, wherein the tether elements are operatively coupled to one another at the tether intersection and wherein the tether elements extend radially away from the tether intersection to points of secure attachment remote from the impact face portion; and an elongate anchoring line having a first end secured to the profile restraining tether elements substantially at the tether intersection, a second end normally anchored in releasable relation to a support structure remote from the impact face portion of the air bag cushion and an intermediate segment between the first end and the second end normally threaded through at least a portion of said plurality of guide slots disposed at the interior surface of side portions of the air bag cushion such that the side portions of the air bag cushion are normally held at the anchoring line at least partially restraining the side portions against full radial expansion, the anchoring line having an operative length such that when the anchoring line is anchored to the support structure the tether intersection is pulled towards the support structure and the inflated profile of the air bag cushion is restrained to a first depth, and wherein the anchoring line is releasable from anchoring relation to the support structure in response to an activation signal such that the anchoring line is disengaged from said plurality of guide slots disposed at the interior surface of side portions of the air bag cushion and such that the tether elements restrain the air bag cushion to a second depth which is greater than said first depth when the anchoring line is released from the support structure.

5. The invention as recited in claim 4, wherein a substantially two dimensional tether guide element is secured to an interior surface of the impact face portion, the tether guide element comprising a plurality of peripheral openings adapted for sliding passage of the profile restraining tether elements and an interior opening inboard of the peripheral openings adapted for sliding passage of the tether intersection and surrounding portions of the tether elements therethrough when the anchoring line is anchored to the support structure.

6. The invention as recited in claim 5, wherein the tether guide element comprises a panel of pliable material.

7. The invention as recited in claim 6, wherein the panel of pliable material comprises a textile fabric.

8. The invention as recited in claim 4, wherein the points of secure attachment remote from the impact face portion are disposed at interior surfaces of the side portions of the air bag cushion.

9. The invention as recited in claim 4, wherein the tether intersection is secured in fixed relation to the impact face portion of the air bag cushion.

10. The invention as recited in claim 9, wherein the points of secure attachment remote from the impact face portion are disposed at interior surfaces of the side portions of the air bag cushion.

* * * * *